United States Patent
Juhl

(10) Patent No.: US 11,344,150 B1
(45) Date of Patent: May 31, 2022

(54) ABSORBENT PAD FOR BREWING DEVICES

(71) Applicant: Joanna Juhl, Bowling Green, KY (US)

(72) Inventor: Joanna Juhl, Bowling Green, KY (US)

( * ) Notice: Subject to any disclaimer, the term of this patent is extended or adjusted under 35 U.S.C. 154(b) by 105 days.

(21) Appl. No.: 16/864,003

(22) Filed: Apr. 30, 2020

(51) Int. Cl.
*A47J 31/00* (2006.01)
*A47J 31/44* (2006.01)
*A47G 23/03* (2006.01)

(52) U.S. Cl.
CPC .......... *A47J 31/4428* (2013.01); *A47G 23/03* (2013.01)

(58) Field of Classification Search
None
See application file for complete search history.

(56) References Cited

U.S. PATENT DOCUMENTS

| | | | | |
|---|---|---|---|---|
| 2,709,905 | A * | 6/1955 | Dunlap | A47G 23/03 248/346.11 |
| 3,086,314 | A * | 4/1963 | Pender | A47G 23/03 248/346.11 |
| 3,195,847 | A * | 7/1965 | Squires | A47G 23/03 248/346.11 |
| 3,268,198 | A * | 8/1966 | Swett | A47G 19/2283 248/346.11 |
| 4,858,872 | A * | 8/1989 | Witt | A47G 23/03 248/346.11 |
| 4,929,480 | A | 5/1990 | Midkiff et al. | |
| 6,082,866 | A * | 7/2000 | Amedee | A47G 23/0309 362/101 |
| 6,715,604 | B2 * | 4/2004 | Taylor | A47G 23/032 206/204 |
| 2007/0228243 | A1 * | 10/2007 | Phillips | A47G 23/03 248/346.11 |
| 2010/0320351 | A1 * | 12/2010 | Jeffery | A47G 23/032 248/346.11 |

FOREIGN PATENT DOCUMENTS

DE 202005020722 U1 * 8/2006 ............. A47J 31/44

* cited by examiner

*Primary Examiner* — Steven M Marsh
(74) *Attorney, Agent, or Firm* — Sanchelima & Associates, P.A.; Christian Sanchelima; Jesus Sanchelima

(57) ABSTRACT

An absorbent pad for brewing devices is disclosed herein. The absorbent pad for brewing devices comprises an absorbent pad, shaped in the form of a daisy, for use in single-cup brewing devices. The device may be used in the coffee cup catch tray of single-cup brewing systems to absorb spills and drips associated with pouring and brewing coffee. The device eliminates the need of frequently washing the catch tray located under the cup rest. One version of the device may be manufactured using biodegradable, recyclable, disposable material. Current dimensions of the device are approximately 2" in diameter but may be manufactured in different sizes depending on intended use. The device can be used in private or commercial settings. The absorbent pad catches the remaining drops of coffee after a cup is made and further prevents the catch tray form getting messy.

9 Claims, 4 Drawing Sheets

ABSORBENT PAD FOR BREWING DEVICES

BACKGROUND OF THE INVENTION

1. Field of the Invention

The present invention relates to an absorbent pad and, more particularly, to a disposable absorbent pad used in brewing devices that reduce the mess caused by brewing a beverage.

2. Description of the Related Art

Several designs for an absorbent pad have been designed in the past. None of them, however, include an absorbent pad, shaped in the form of a daisy, for use in single-cup brewing devices. The device may be used in the coffee cup catch tray of single-cup brewing systems to absorb spills and drips associated with pouring and brewing coffee. The device eliminates the need of frequently washing the catch tray located under the cup rest. One version of the device may be manufactured using biodegradable, recyclable, disposable material. Current dimensions of the device are approximately 2" in diameter but may be manufactured in different sizes depending on intended use. The device can be used in private or commercial settings. It is known that individuals often spill liquid around brewing devices. It is also known that these spills may cause damage to surrounding areas and attract various insects. Therefore, there is a need for a disposable absorbent pad to be used with brewing devices to reduce the mess caused by them.

Applicant believes that a related reference corresponds to international application (published application) No. DE202015005816U1 issued for a moisture-absorbent pad design for coffee machines for above and below the drip tray. Applicant believes that another reference corresponds to DE202005007746U1 issued for a mat for use in drip tray of espresso or coffee machine. Applicant believes yet another reference corresponds to U.S. Pat. No. 4,929,480 issued for an absorbent structure for absorbing food product liquids. However, these references differ from the present invention because the references fail to disclose a daisy shape, along with sustainable construction and the disposability of the invention. The present invention is further biodegradable, recyclable, and made of disposable materials.

Other documents describing the closest subject matter provide for a number of more or less complicated features that fail to solve the problem in an efficient and economical way. None of these patents suggest the novel features of the present invention.

SUMMARY OF THE INVENTION

It is one of the objectives of the present invention to provide an absorbent pad for liquid producing devices that catches the remaining drops of fluid after a container is full and further prevents the catch tray from getting messy.

It is another object of this invention to provide an absorbent pad for brewing devices that eliminates the need to wash the catch tray by hand after brewing coffee.

It is still another object of the present invention to provide an absorbent pad for brewing devices that is easy to use and ideal for personal use as well as use for hotels, beauty salons, automotive dealers and the like.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
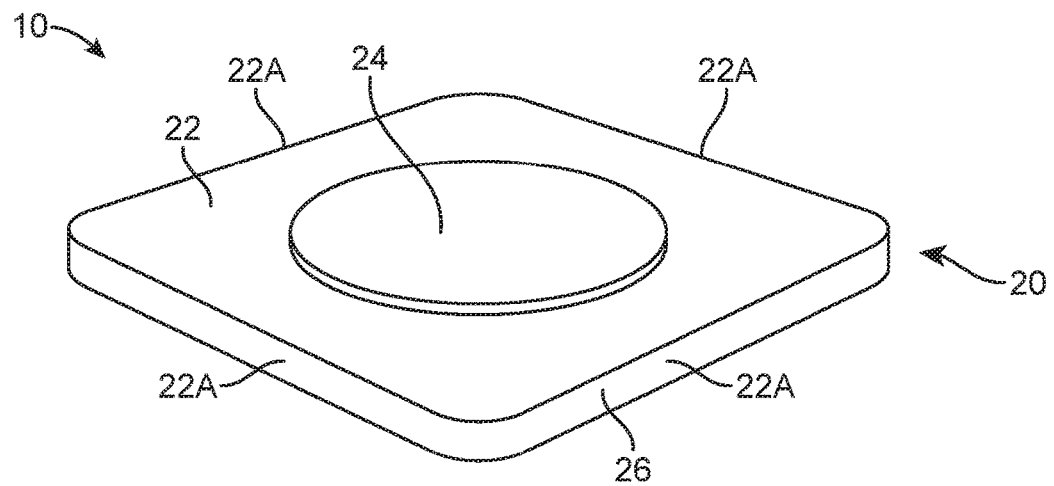
FIG. 1 represents an isometric view of an absorbent pad for brewing devices 10 in accordance to an embodiment of the present invention.
Figure 2:
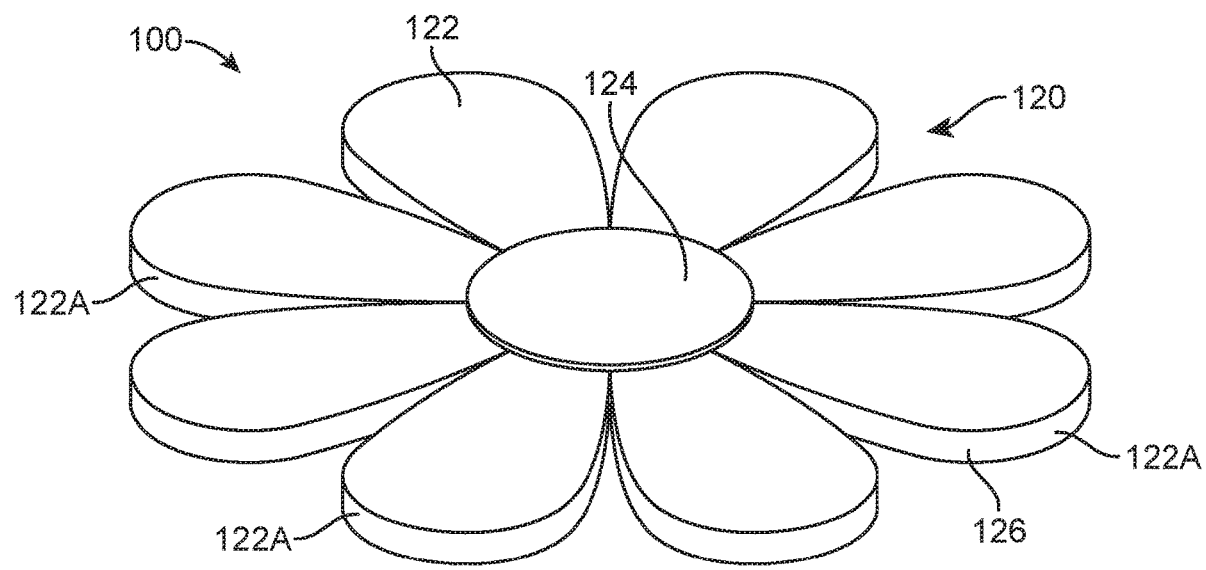
FIG. 2 shows an isometric view of an absorbent pad for brewing devices 100 in accordance to another embodiment of the present invention.
Figure 3:
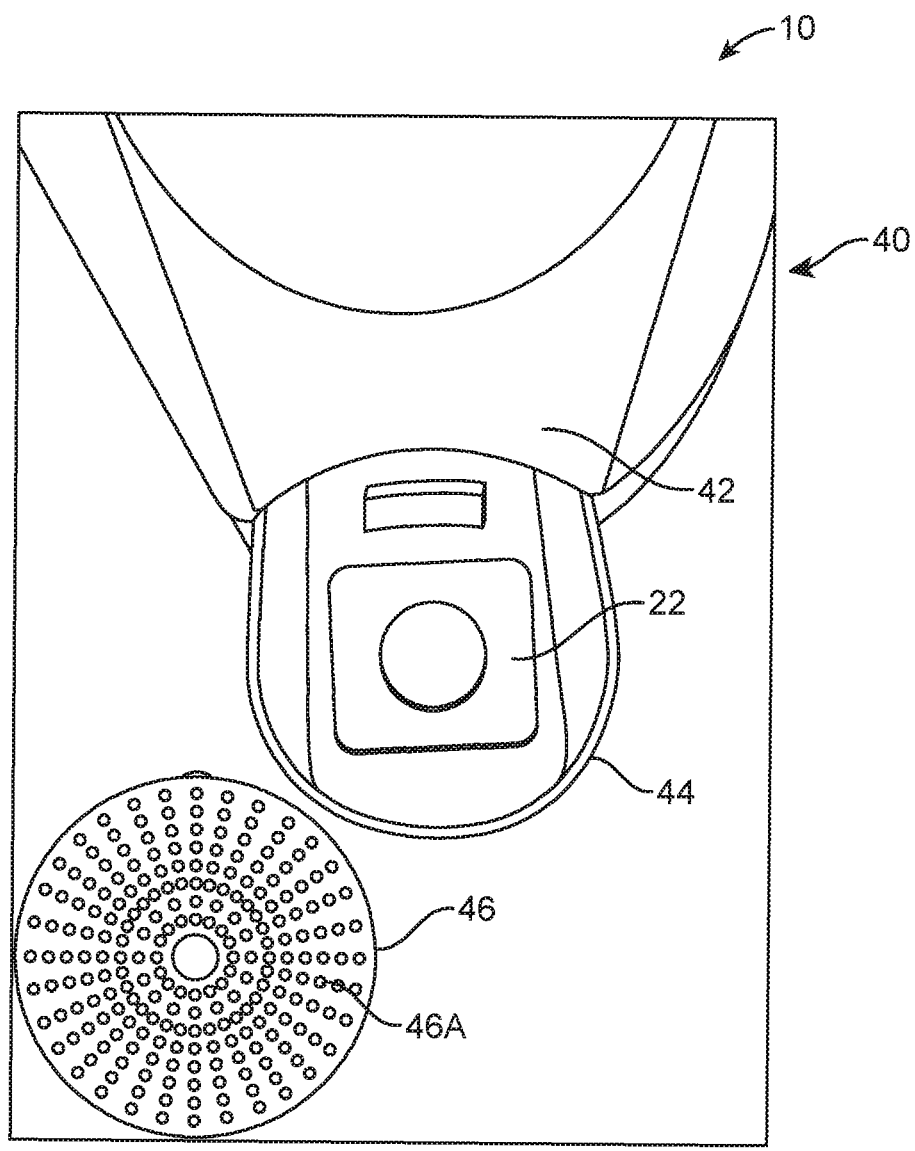
FIG. 3 illustrates another isometric view of an absorbent pad for brewing devices 10 in use with a brewing device 42 in accordance to an embodiment of the present invention.
Figure 4:
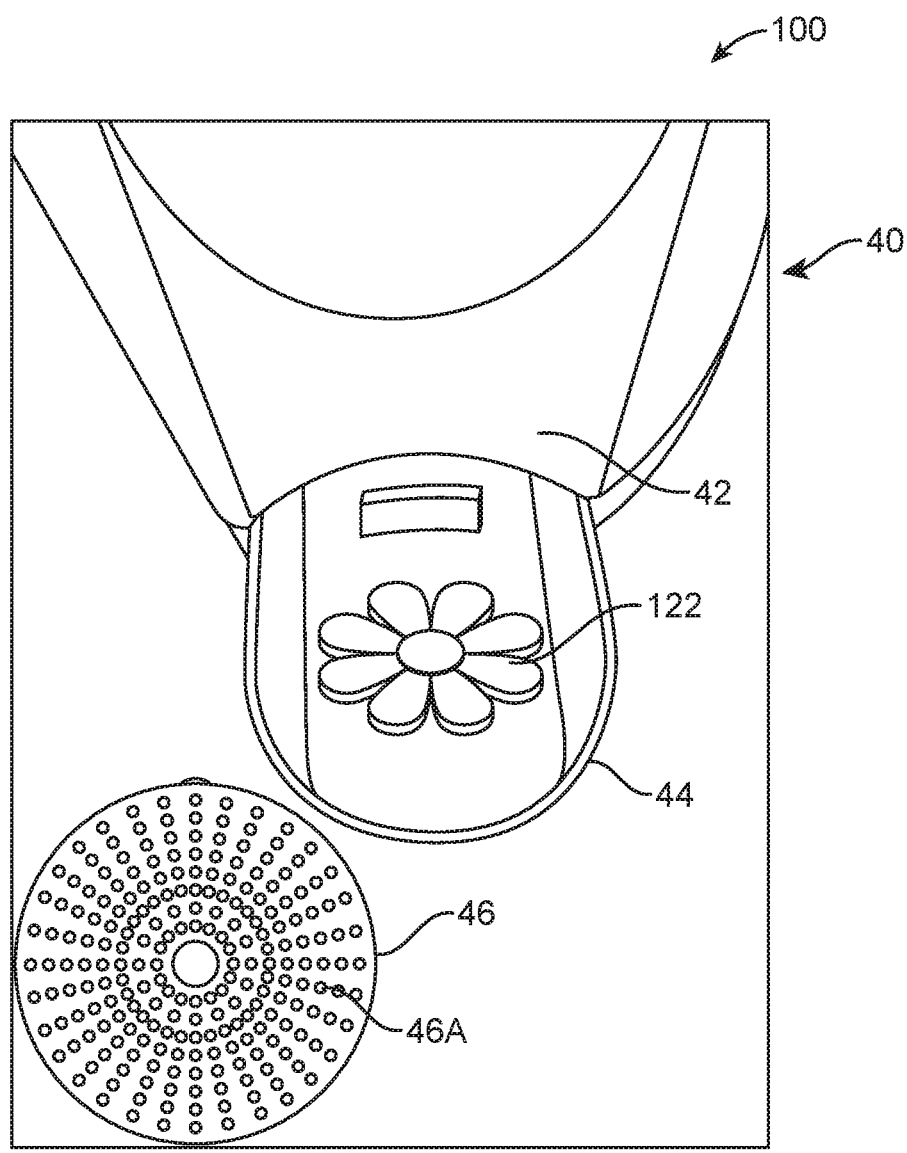
FIG. 4 is a representation of another isometric view of an absorbent pad for brewing devices 100 in use with a brewing device 42 in accordance to another embodiment of the present invention.
Figure 5:
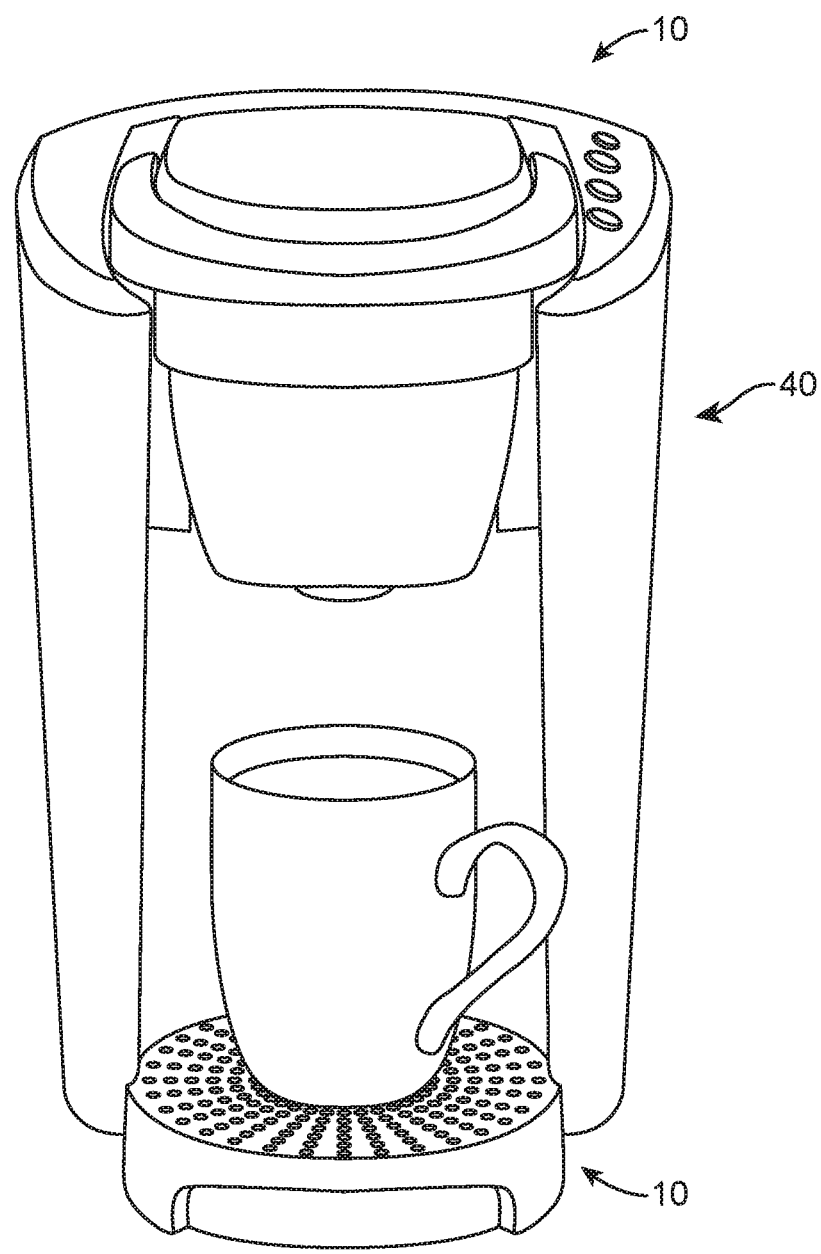
FIG. 5 illustrates an isometric view of brewing assembly 40 having absorbent pad assembly 20 therein and in use brewing a cup of coffee in accordance to an embodiment of the present invention.

Referring now to the drawings, where the present invention is generally referred to with numeral 10, it can be observed an absorbent pad for brewing devices 10 that includes an absorbent pad assembly 20 and a brewing device assembly 40.

Absorbent pad assembly 20 includes an absorbent pad 22 having four perimeter sides 22A. In one embodiment of the present invention, absorbent pad 22 is made of an absorbent material such as those found in paper towels. However, it should be understood that any suitable absorbent material may be used for absorbent pad 22. In another embodiment of the present invention perimeter sides 22A are all of equal length to form a square shape. It should be understood, that other embodiments of the invention may comprise perimeter sides 22A of different lengths. Absorbent pad 22 further includes a protrusion 24 mounted to the center of absorbent pad 22. In an embodiment of the present invention, protrusion 24 is made of the same material as that of absorbent pad 22 and comprises a circular shape. Protrusion 24 extends upwardly a predetermined amount from absorbent pad 22. Additionally, absorbent pad 22 includes a thickness 26 that cooperates with the absorbing of a liquid substance. In an embodiment of the present invention, absorbent pad 22 is disposable in nature. Furthermore, absorbent pad 22 may be made of a biodegradable material. Absorbent pad 22 may also be made of a recyclable material. In the present embodiment, absorbent pad assembly 20 is mounted onto brewing device assembly 40.

In another embodiment of the present invention, an absorbent pad for brewing devices 100 comprises absorbent pad assembly 120. Absorbent pad assembly 120 includes an absorbent pad 122 comprising the shape of a daisy flower having petals 122A thereon. Absorbent pad 122 and petals 122A are made of a suitable absorbent material to absorb liquid. Absorbent pad 122 further includes a protrusion 124 disposed on the center of absorbent pad 122. Additionally, absorbent pad 122 includes a thickness 126 that supports the absorbing of a liquid material. Absorbent pad assembly 120 mounted onto brewing device assembly 40.

Brewing device assembly 40 includes a brewing device 42 having a drip tray 44. Brewing device 42 may be any suitable brewing device known in the art for brewing beverages such as coffee and tea. This may include but not limited to any type of liquid producing device to produce liquids such as coffee, tea, soda, oil, paint, water dispensers, shakers, and drippers. In one embodiment of the present invention brewing device 42 is a single cup brewing device. Drip tray 44 is a hollow attachment to brewing device 42 and includes a drip cover 46 thereon. Drip tray 44 and drip cover 46 may be made of plastic or any other suitable material. In an embodiment of the present invention, drip cover 46 is removable from drip tray 44 to allow easy access to the contents within drip tray 44. Drip cover 46 further comprises a plurality of holes 46A to allow liquid spills caused by brewing beverages to pass through drip cover 46 and reach drip tray 44. Drip tray 44 is configured to catch any liquid spill or mess that may result when brewing a beverage. In the present embodiment, absorbent pad assembly 20 is placed within drip tray 44 of brewing device assembly 40. When a beverage is brewed, any spill will be transferred into drip tray 44 and absorbed by absorbent pad 22. As a result, a cleaner environment for a brewing device 42 is produced.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for an absorbent pad, comprising:
   a. an absorbent pad assembly, including an absorbent pad being made of an absorbent material, said absorbent pad having four perimeter sides, wherein each perimeter side is of an equal length, wherein said absorbent pad has rounded corners, wherein said absorbent pad further comprises a protrusion disposed on the center of said absorbent pad, wherein said protrusion extends upwardly a predetermined amount from said absorbent pad, said absorbent pad further having a thickness, said thickness supports the absorbing of a liquid substance, wherein said absorbent pad is made of a biodegradable and recyclable material; and
   b. a brewing device assembly, including a brewing device having a drip tray, wherein said drip tray includes a removable drip cover, wherein said absorbent pad is place within said drip tray.

2. The system for an absorbent pad of claim 1 wherein said absorbent pad comprises a rectangular shape.

3. The system for an absorbent pad of claim 1 wherein said absorbent pad is disposable.

4. The system for an absorbent pad of claim 1 wherein said protrusion in circular in shape.

5. The system for an absorbent pad of claim 1 wherein said drip tray is of a shape that cooperates with the shape of said absorbent pad.

6. The system for an absorbent pad of claim 1 wherein said thickness is of a length that is less than said four perimeter sides.

7. The system for an absorbent pad of claim 1 wherein said drip cover further comprises a plurality of holes.

8. A system for an absorbent pad, comprising:
   a. an absorbent pad assembly, including an absorbent pad being made of an absorbent material, said absorbent pad comprises a daisy shape having eight petals thereon, wherein said absorbent pad further comprises a protrusion disposed on the center of said absorbent pad, wherein said protrusion extends upwardly a predetermined amount form said absorbent pad, said absorbent pad further having a thickness, said thickness supports the absorbing of a liquid substance, wherein said absorbent pad is made of a biodegradable and recyclable material; and
   b. a brewing device assembly, a brewing device assembly, including a brewing device having a drip tray, wherein said drip tray includes a removable drip cover, wherein said absorbent pad is place within said drip tray, wherein said drip cover further comprises a plurality of holes to allow a liquid substance to pass therethrough, wherein said brewing device is a single cup brewing device.

9. A system for an absorbent pad, consisting of:
   a. an absorbent pad assembly, including an absorbent pad being made of an absorbent material, said absorbent pad having four perimeter sides, wherein each perimeter side is of an equal length, said absorbent pad is rectangular with rounded corners, wherein said absorbent pad further comprises a protrusion disposed on the center of said absorbent pad, wherein said protrusion extends upwardly a predetermined amount from said absorbent pad, wherein said protrusion in circular in shape, said absorbent pad further having a thickness, said thickness supports the absorbing of a liquid substance, wherein said absorbent pad is made of a biodegradable and recyclable material, wherein said absorbent pad is disposable, wherein said thickness is of a length that is less than said four perimeter sides; and
   b. a brewing device assembly, including a brewing device having a drip tray, wherein said drip tray includes a removable drip cover, wherein said absorbent pad is place within said drip tray, wherein said drip cover further comprises a plurality of holes, wherein said drip tray is of a shape that cooperates with the shape of said absorbent pad.

\* \* \* \* \*